(12) United States Patent
Lin et al.

(10) Patent No.: US 12,413,137 B2
(45) Date of Patent: Sep. 9, 2025

(54) CONTROLLER FOR CONTROLLING BLOCKING SWITCH OF POWER CONVERTER

(71) Applicant: Power Forest Technology Corporation, Hsinchu County (TW)

(72) Inventors: Meng Hung Lin, Taichung (TW); Chien Lung Li, Hsinchu County (TW); Yi-Heng Wu, Changhua County (TW)

(73) Assignee: Power Forest Technology Corporation, Hsinchu (TW)

( * ) Notice: Subject to any disclaimer, the term of this patent is extended or adjusted under 35 U.S.C. 154(b) by 202 days.

(21) Appl. No.: 18/509,314

(22) Filed: Nov. 15, 2023

(65) Prior Publication Data

US 2025/0112543 A1  Apr. 3, 2025

(30) Foreign Application Priority Data

Oct. 3, 2023  (TW) ................................. 112137837

(51) Int. Cl.
*H02M 1/08* (2006.01)
*H02M 3/155* (2006.01)

(52) U.S. Cl.
CPC ............. *H02M 1/08* (2013.01); *H02M 3/155* (2013.01)

(58) Field of Classification Search
CPC .................................. H02M 1/08; H02M 3/155
See application file for complete search history.

(56) References Cited

U.S. PATENT DOCUMENTS

| 2007/0194629 | A1* | 8/2007 | Itoh | ........................ | G01R 23/09 |
| | | | | | 307/413 |
| 2020/0021282 | A1* | 1/2020 | Yamamoto | ........... | H03K 17/168 |
| 2021/0036697 | A1* | 2/2021 | Yamamoto | ......... | H03K 17/0822 |

FOREIGN PATENT DOCUMENTS

| CN | 1881764 | 12/2006 |
| CN | 102790373 | 11/2012 |
| CN | 110574273 | 12/2019 |
| CN | 113826205 | 12/2021 |
| CN | 218102981 | 12/2022 |
| TW | 201611486 | 3/2016 |
| WO | 2020021757 | 1/2020 |

OTHER PUBLICATIONS

"Office Action of Taiwan Counterpart Application", issued on Feb. 29, 2024, p. 1-p. 8.

* cited by examiner

*Primary Examiner* — Rafael O De Leon Domenech
(74) *Attorney, Agent, or Firm* — JCIPRNET

(57) ABSTRACT

A controller for controlling a blocking switch of a power converter is provided. The controller includes a control pin and a sensing circuit. The control pin is coupled to a control terminal of the blocking switch and an output terminal of the blocking switch. The sensing circuit includes a control switch and a judgment circuit. A first terminal of the control switch is coupled to the control pin. A second terminal of the control switch is coupled to a reference low voltage. The judgment circuit turns on the control switch during a period when the blocking switch is turned off to obtain a sensing current value of a current flowing through the control switch. When the sensing current value is lower than a reference current value, the judgment circuit provides a notification signal for allowing the blocking switch to be turned on.

10 Claims, 3 Drawing Sheets

CONTROLLER FOR CONTROLLING BLOCKING SWITCH OF POWER CONVERTER

CROSS-REFERENCE TO RELATED APPLICATION

This application claims the priority benefit of Taiwan application serial no. 112137837, filed on Oct. 3, 2023. The entirety of the above-mentioned patent application is hereby incorporated by reference herein and made a part of this specification.

BACKGROUND

Technical Field

The disclosure relates to a controller, and in particular to a controller for controlling a blocking switch of a power converter.

Description of Related Art

Generally speaking, a power converter may output an output power provided by the power converter through a blocking switch. Based on Vsafe0V standard, when a voltage value at an output terminal of the blocking switch is lower than a standard value (for example, 0 to 0.8 volts), the blocking switch is allowed to be turned on. Therefore, a controller for controlling the blocking switch must have a control pin for controlling the blocking switch and a detection pin for detecting the voltage value at the output terminal (for example, a Vbus terminal) of the blocking switch.

Based on the trend of size reduction of elements, the number of pins of the controller is reduced. Therefore, how to use the same pin to detect the voltage value at the output terminal of the blocking switch and perform a switching operation on the blocking switch is one of the research focuses of persons skilled in the art.

SUMMARY

The disclosure provides a controller for controlling a blocking switch of a power converter, which can detect a voltage value at an output terminal of the blocking switch and perform a switching operation on the blocking switch using a single pin.

A controller of the disclosure is used to control a blocking switch of a power converter. The controller includes a control pin and a sensing circuit. The control pin is coupled to a control terminal of the blocking switch and an output terminal of the blocking switch. The controller controls a switching operation of the blocking switch through the control pin. The sensing circuit includes a control switch and a judgment circuit. A first terminal of the control switch is coupled to the control pin. A second terminal of the control switch is coupled to a reference low voltage. The judgment circuit is coupled to the first terminal of the control switch and the control pin. The judgment circuit turns on the control switch during a period when the blocking switch is turned off to obtain a sensing current value of a current flowing through the control switch. When the sensing current value is lower than a reference current value, the judgment circuit provides a notification signal for allowing the blocking switch to be turned on.

Based on the above, the control pin is coupled to the control terminal of the blocking switch and the output terminal of the blocking switch. The controller controls the switching operation of the blocking switch through the control pin. The judgment circuit obtains the sensing current value through the control pin and determines whether to provide the notification signal accordingly. The controller of the disclosure can control the switching operation of the blocking switch through the control pin and detect the voltage value at the output terminal of the blocking switch. In this way, the number of pins of the controller can be reduced. In addition, the size of the controller can also be reduced.

DESCRIPTION OF THE EMBODIMENTS

Figure 1:
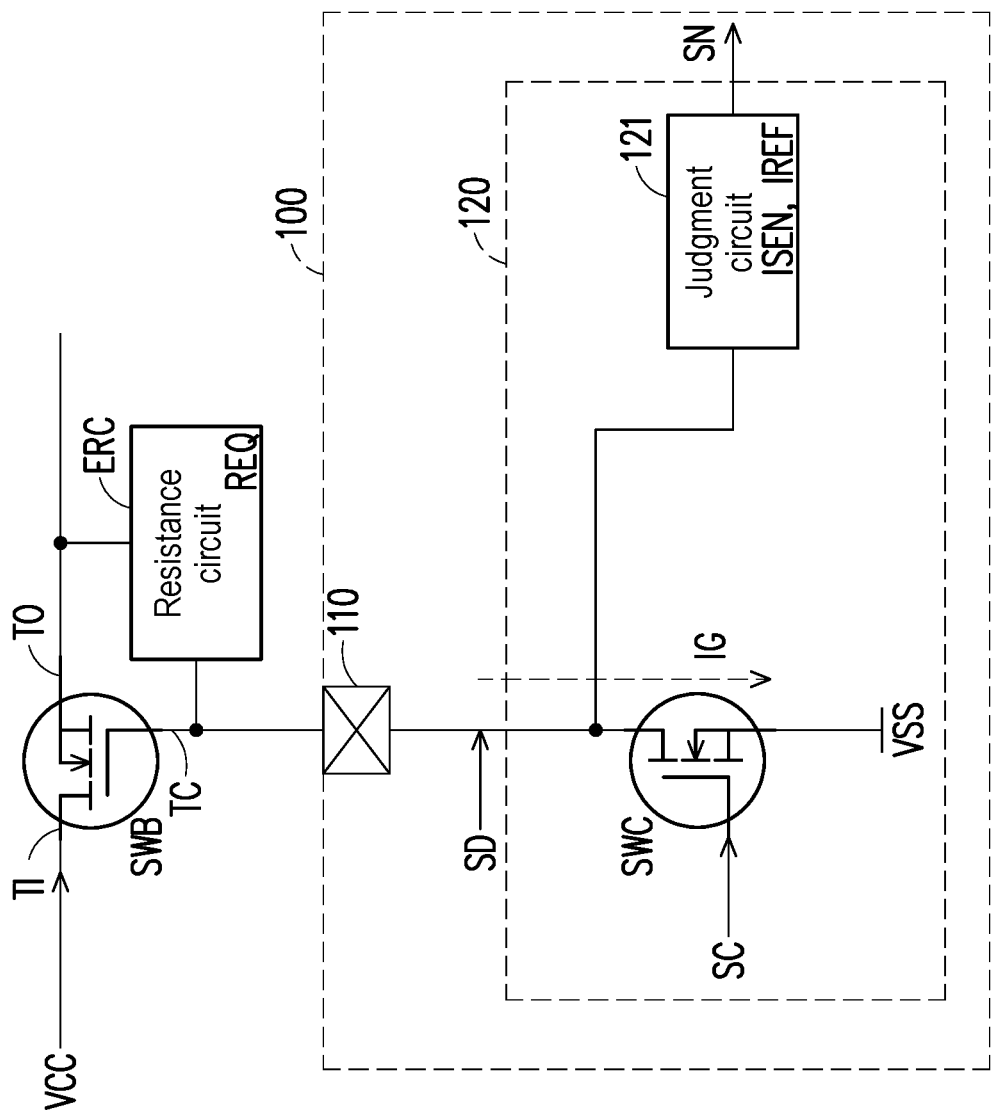
FIG. 1 is a schematic diagram of a blocking switch and a controller according to an embodiment of the disclosure.

Some embodiments of the disclosure will be described in detail with reference to the drawings. For the reference numerals cited in the following description, when the same reference numerals appear in different drawings, the reference numerals will be regarded as referring to the same or similar elements. The embodiments are only a part of the disclosure and do not disclose all possible implementations of the disclosure. More specifically, the embodiments are merely examples in the claims of the disclosure.

Please refer to FIG. 1. FIG. 1 is a schematic diagram of a blocking switch and a controller according to an embodiment of the disclosure. FIG. 1 shows a blocking switch SWB of a power converter and a controller 100 for controlling the blocking switch SWB. In the embodiment, the controller 100 includes a control pin 110 and a sensing circuit 120. The control pin 110 is coupled to a control terminal TC of the blocking switch SWB and an output terminal TO of the blocking switch SWB. The controller 100 controls a switching operation of the blocking switch SWB through the control pin 110.

For example, the blocking switch SWB may be implemented by an n-type field effect transistor. The blocking switch SWB is, for example, an n-metal-oxide-semiconductor (NMOS) field effect transistor. An input terminal TI of the blocking switch SWB receives an output power VCC. The controller 100 provides a control signal SD with a high voltage level to the control terminal TC of the blocking switch SWB through the control pin 110, thereby turning on the blocking switch SWB. Therefore, the blocking switch SWB transmits the output power VCC to the output terminal TO. The controller 100 provides a control signal SD with a low voltage level to the control terminal TC of the blocking switch SWB through the control pin 110, thereby turning off the blocking switch SWB. Therefore, the blocking switch SWB does not transmit the output power VCC to the output terminal TO.

In the embodiment, the sensing circuit 120 includes a control switch SWC and a judgment circuit 121. A first terminal of the control switch SWC is coupled to the control pin 110. A second terminal of the control switch SWC is coupled to a reference low voltage VSS. The judgment circuit 121 is coupled to the first terminal of the control switch SWC and the control pin 110. The judgment circuit 121 turns on the control switch SWC during a period when the blocking switch SWB is turned off to obtain a sensing current value ISEN of a current IG flowing through the control switch SWC. When the sensing current value ISEN is lower than a reference current value IREF, the judgment circuit 121 provides a notification signal SN for allowing the blocking switch SWB to be turned on. The controller 100 turns off the control switch SWC in response to the notification signal SN and turns on the blocking switch SWB through the control pin 110.

It is worth mentioning here that the controller 100 controls the switching operation of the blocking switch SWB through the control pin 110. The judgment circuit 121 obtains the sensing current value ISEN through the control pin 110 and determines whether to provide the notification signal SN accordingly. The controller 100 of the disclosure can control the switching operation of the blocking switch SWB through the control pin 110 and detect a voltage value at the output terminal TO of the blocking switch SWB. In this way, the number of pins of the controller 100 can be reduced. In addition, the size of the controller 100 can also be reduced.

Further, when the sensing current value ISEN is lower than the reference current value IREF, the judgment circuit 121 learns that the voltage value at the output terminal TO of the blocking switch SWB is lower than a standard voltage value for the blocking switch SWB to be allowed to be turned on, which means that the blocking switch SWB may comply with Vsafe0V standard and is allowed to be turned on. Therefore, the judgment circuit 121 provides the notification signal SN.

In the embodiment, when the sensing current value ISEN is higher than or equal to the reference current value IREF, the judgment circuit 121 does not provide the notification signal SN. Therefore, the controller 100 continues to turn off the blocking switch SWB and continues to turn on the control switch SWC. In the embodiment, during a period when the control switch SWC is turned on, the controller 100 pulls down a voltage value at the control pin 110 using the reference low voltage VSS. Therefore, the blocking switch SWB continues to be turned off.

In the embodiment, the control pin 110 is coupled to the output terminal TO of the blocking switch SWB via a resistance circuit ERC. The sensing current value ISEN is determined by the voltage value at the output terminal TO of the blocking switch SWB, an equivalent resistance value REQ of the resistance circuit ERC, and the reference low voltage VSS.

In the embodiment, the control switch SWC may be implemented by a transistor switch. Taking the embodiment as an example, the control switch SWC may be an NMOS field effect transistor. A control terminal of the control switch SWC receives a control signal SC and is turned on or turned off in response to the control signal SC.

Figure 2:
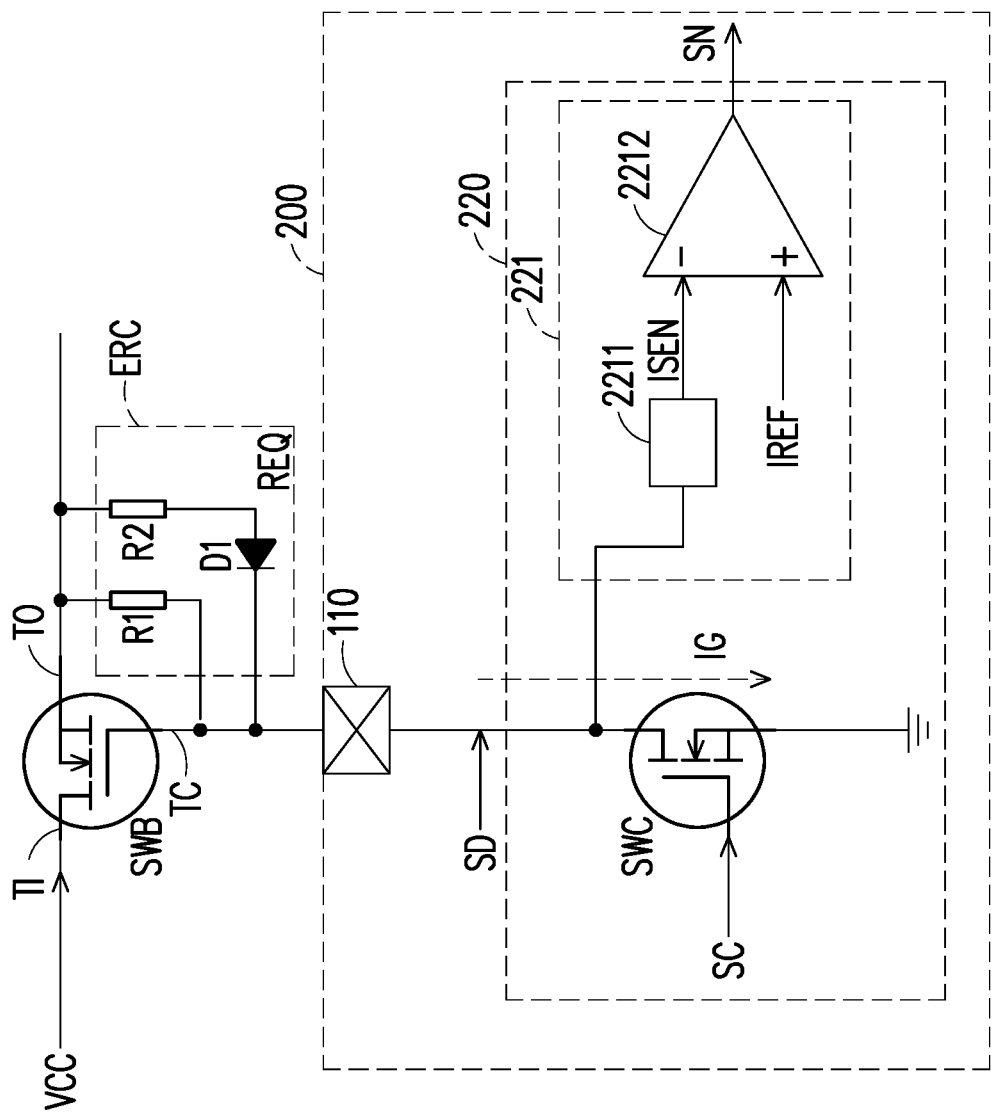
FIG. 2 is a schematic diagram of a blocking switch and a controller according to an embodiment of the disclosure.

Please refer to FIG. 2. FIG. 2 is a schematic diagram of a blocking switch and a controller according to an embodiment of the disclosure. In the embodiment, a controller 200 includes a control pin 210 and a sensing circuit 220. The control pin 210 is coupled to a control terminal TC of a blocking switch SWB and an output terminal TO of the blocking switch SWB. The controller 200 controls a switching operation of the blocking switch SWB through the control pin 210. The sensing circuit 220 includes a control switch SWC and a judgment circuit 221. A first terminal of the control switch SWC is coupled to the control pin 210. A second terminal of the control switch SWC is coupled to a reference low voltage. In the embodiment, the reference low voltage is a ground terminal.

During a period when the blocking switch SWB is turned off, the judgment circuit 221 turns on the control switch SWC. The judgment circuit 221 includes a current sensor 2211 and a comparator 2212. The current sensor 2211 is coupled to the first terminal of the control switch SWC. The current sensor 2211 senses a current IG flowing through the control switch SWC during the period when the blocking switch SWB is turned off to generate a sensing current value ISEN. The comparator 2212 is coupled to the current sensor 2211. The comparator 2212 compares the sensing current value ISEN with a reference current value IREF during the period when the blocking switch SWB is turned off. When the sensing current value ISEN is lower than the reference current value IREF, the comparator 2212 provides a notification signal SN.

In the embodiment, an inverting input terminal of the comparator 2212 receives the sensing current value ISEN. A non-inverting input of the comparator 2212 receives the reference current value IREF. Therefore, the notification signal SN output by the comparator 2212 is a signal with a high voltage level. The controller 100 turns off the control switch SWC in response to the notification signal SN and turns on the blocking switch SWB through the control pin 110.

In the embodiment, the control pin 210 is coupled to the output terminal TO of the blocking switch SWB via a resistance circuit ERC. The resistance circuit ERC includes resistors R1 and R2 and a diode D1. The resistor R1 is coupled between the output terminal TO of the blocking switch SWB and the control pin 110. A first terminal of the resistor R2 is coupled to the output terminal TO of the blocking switch SWB. A second terminal of the resistor R2 is coupled to an anode of the diode D1. A cathode of the diode D1 is coupled to the control pin 110.

For example, it is assumed that the voltage value at the output terminal TO of the blocking switch SWB must be lower than 0.1 volts for the blocking switch SWB to be allowed to be turned on. In other words, when a voltage difference value between the output terminal TO of the blocking switch SWB and the ground terminal is lower than 0.1 volts, the blocking switch SWB is allowed to be turned on. Therefore, the reference current value IREF is equal to the quotient of 0.1 volts divided by an equivalent resistance value REQ of the resistance circuit ERC. When the sensing current value ISEN is lower than the reference current value IREF, this means that the voltage value at the output terminal TO of the blocking switch SWB is lower than 0.1 volts. Therefore, the comparator 2212 provides the notification signal SN. On the other hand, when the sensing current value ISEN is higher than or equal to the reference current value IREF, the comparator 2212 does not provide the notification signal SN.

Figure 3:
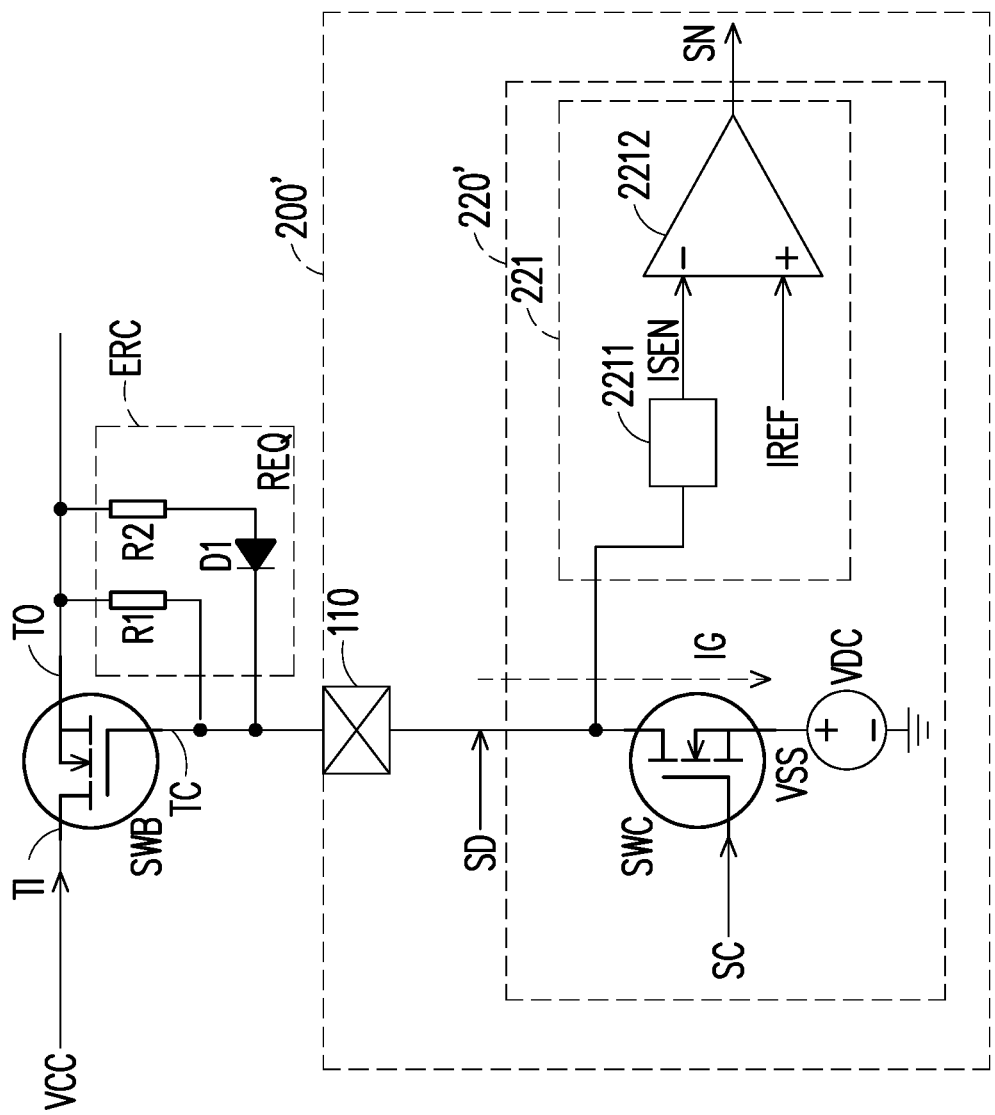
FIG. 3 is a schematic diagram of a blocking switch and a controller according to an embodiment of the disclosure.

Please refer to FIG. 3. FIG. 3 is a schematic diagram of a blocking switch and a controller according to an embodiment of the disclosure. In the embodiment, a controller 200' includes a control pin 210 and a sensing circuit 220'. The control pin 210 is coupled to a control terminal TC of a blocking switch SWB and an output terminal TO of the blocking switch SWB. The controller 200' controls a switching operation of the blocking switch SWB through the control pin 210. The sensing circuit 220' includes a control switch SWC and a judgment circuit 221. The configuration of the judgment circuit 221 and the resistance circuit ERC are clearly explained in the embodiment of FIG. 2 and will not be repeated here. A first terminal of the control switch SWC is coupled to the control pin 210. A second terminal of the control switch SWC is coupled to a reference low voltage VSS. The difference from FIG. 2 is that the reference low voltage VSS in the embodiment is provided by a voltage source VDC.

For example, a voltage value at the output terminal TO of the blocking switch SWB must be lower than 0.1 volts for the blocking switch SWB to be allowed to be turned on. The voltage source VDC provides the reference low voltage VSS with 0.1 volts. In other words, when a voltage difference value between the output terminal TO of the blocking switch SWB and the reference low voltage VSS is lower than 0 volts, the blocking switch SWB is allowed to be turned on. Therefore, a reference current value IREF is equal to 0 amps. When the sensing current value ISEN is lower than the reference current value IREF (that is, the sensing current value ISEN is lower than 0 amps), this means that the voltage value at the output terminal TO of the blocking switch SWB is lower than 0.1 volts. Therefore, a comparator 2212 provides a notification signal SN. On the other hand, when the sensing current value ISEN is higher than or equal to the reference current value IREF (that is, the sensing current value ISEN is higher than or equal to 0 amps), the comparator 2212 does not provide the notification signal SN.

In summary, the controller includes the control pin and the sensing circuit. The control pin is coupled to the control terminal of the blocking switch and the output terminal of the blocking switch. The controller controls the switching operation of the blocking switch through the control pin. The judgment circuit obtains the sensing current value through the control pin and determines whether to provide the notification signal accordingly. The controller can control the switching operation of the blocking switch through the control pin and detect the voltage value at the output terminal of the blocking switch. In this way, the number of pins of the controller can be reduced. In addition, the size of the controller can also be reduced.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A controller for controlling a blocking switch of a power converter, comprising:
   a control pin, coupled to a control terminal of the blocking switch and an output terminal of the blocking switch, wherein the controller controls a switching operation of the blocking switch through the control pin; and
   a sensing circuit, comprising:
      a control switch, wherein a first terminal of the control switch is coupled to the control pin, and a second terminal of the control switch is coupled to a reference low voltage; and
      a judgment circuit, coupled to the first terminal of the control switch and the control pin, and configured to turn on the control switch during a period when the blocking switch is turned off to obtain a sensing current value of a current flowing through the control switch, and provide a notification signal for allowing the blocking switch to be turned on when the sensing current value is lower than a reference current value.

2. The controller according to claim 1, wherein the controller turns off the control switch in response to the notification signal, and turns on the blocking switch through the control pin.

3. The controller according to claim 1, wherein when the sensing current value is higher than or equal to the reference current value, the judgment circuit does not provide the notification signal.

4. The controller according to claim 1, wherein when the sensing current value is higher than or equal to the reference current value, the controller continues to turn off the blocking switch and continues to turn on the control switch.

5. The controller according to claim 1, wherein when the sensing current value is lower than the reference current value, the judgment circuit learns that a voltage value at the output terminal of the blocking switch is lower than a standard voltage value for the blocking switch to be allowed to be turned on.

6. The controller according to claim 1, wherein the reference low voltage is a ground terminal.

7. The controller according to claim 1, wherein the reference low voltage is provided by a voltage source.

8. The controller according to claim 1, wherein the control pin is coupled to the output terminal of the blocking switch via a resistance circuit.

9. The controller according to claim 8, wherein the sensing current value is determined by a voltage value at the output terminal of the blocking switch, an equivalent resistance value of the resistance circuit, and the reference low voltage.

10. The controller according to claim 1, wherein the judgment circuit comprises:
    a current sensor, coupled to the first terminal of the control switch and configured to sense the current flowing through the control switch during the period when the blocking switch is turned off to generate the sensing current value; and
    a comparator, coupled to the current sensor and configured to compare the sensing current value with the reference current value during the period when the blocking switch is turned off, wherein the notification signal is provided when the sensing current value is lower than the reference current value.

\* \* \* \* \*